US006841970B2

(12) United States Patent
Zabramny

(10) Patent No.: US 6,841,970 B2
(45) Date of Patent: Jan. 11, 2005

(54) DUAL-USE GENERATOR AND SHOCK ABSORBER ASSISTANT SYSTEM

(76) Inventor: Mark Zabramny, 16 Galston Dr., West Windsor, NJ (US) 08550

( * ) Notice: Subject to any disclaimer, the term of this patent is extended or adjusted under 35 U.S.C. 154(b) by 121 days.

(21) Appl. No.: 10/323,738

(22) Filed: Dec. 20, 2002

(65) Prior Publication Data

US 2004/0119289 A1 Jun. 24, 2004

(51) Int. Cl.$^7$ .............................................. H01M 10/46
(52) U.S. Cl. ......................... 320/101; 290/53; 180/165
(58) Field of Search ................................ 320/101, 104; 310/15, 17, 20; 180/166, 165; 290/50, 53, 54

(56) References Cited

U.S. PATENT DOCUMENTS

| 3,941,402 | A | | 3/1976 | Yankowski et al. |
| 4,160,181 | A | * | 7/1979 | Lichtenberg ................ 104/289 |
| 4,793,263 | A | | 12/1988 | Basic et al. |
| 4,900,054 | A | | 2/1990 | Kessler |
| 5,327,987 | A | * | 7/1994 | Abdelmalek ................ 180/65.2 |
| 5,678,847 | A | | 10/1997 | Izawa et al. |
| 5,880,532 | A | | 3/1999 | Stopher |
| 6,405,841 | B1 | | 6/2002 | Zeno |
| 2003/0034697 | A1 | * | 2/2003 | Goldner et al. ................ 310/17 |

FOREIGN PATENT DOCUMENTS

| EP | 0616412 A1 | 9/1994 |
| JP | 60-257757 | 12/1985 |
| JP | 6-315294 | 11/1994 |

\* cited by examiner

*Primary Examiner*—Edward H. Tso
(74) *Attorney, Agent, or Firm*—Richard C. Litman

(57) ABSTRACT

A system for converting axle vibration into electricity having an electromechanical transducer switchable between an electrical generator mode that can charge a battery, or simultaneously or alternatively, a shock absorber assistant mode. In the shock absorber assistant mode, the transducer can be used to provide a firmer ride than that provided by the shock absorbers existing on the vehicle. A control panel including switches to select the mode and ride comfort is provided inside the vehicle for use by the occupant.

1 Claim, 4 Drawing Sheets

DUAL-USE GENERATOR AND SHOCK ABSORBER ASSISTANT SYSTEM

BACKGROUND OF THE INVENTION

1. Field of the Invention

The present invention relates to systems for converting reciprocative vertical axle vibrations occurring during operation of a vehicle into electrical energy, and for modifying the ride of the vehicle. In particular, the inventive system uses the same reciprocative electromagnetic transducer as both a generator and a shock absorber assistant, and a control system for switching between these two modes of operation.

2. Description of the Related Art

Systems and devices for converting mechanical energy from reciprocal motion into electrical energy in vehicles are known, as are systems and devices for converting electrical to mechanical energy. However, these systems typically are limited to one of these types of energy conversion rather providing both capabilities. Moreover, even when both of these types of conversion are present or suggested, no system for selectively switching between the two types and for modifying ride comfort, is provided or taught.

U.S. Pat. No. 6,405,841, issued to Zeno on Jun. 18, 2002, teaches an electromagnetic shock absorber. U.S. Pat. No. 5,880,532, issued to Stopher on Mar. 9, 1999, teaches an electromagnetic generator for converting the energy released by a vehicle when the brakes are applied into electrical energy. U.S. Pat. No. 5,678,847 issued to Izawa et al. on Oct. 21, 1997, teaches an active vehicle suspension system using an electromagnetic actuator.

U.S. Pat. No. 4,900,054, issued to Kessler on Feb. 13, 1990, teaches an electromagnetic vehicle suspension system using a battery for power. U.S. Pat. No. 4,793,263, issued to Basic et al. on Dec. 27, 1988, teaches an electromagnetic propulsion system for use on rail-supported vehicle. U.S. Pat. No. 4,160,181, issued to Lichtenberg on Jul. 3, 1979, teaches an electrical generator for use on a vehicle that uses the eddy current effect.

U.S. Pat. No. 3,941,402, issued to Yankowski et al., teaches an electromagnetic shock absorber that uses a linear transducer to provide electrical power to operate the shock absorber. Japanese Patent No. 6-315294 teaches a linear oscillation actuator. Japanese Pat. No. 60-257757 teaches an electromagnetic generator.

European Patent No. 616,412, published Sep. 21, 1994, teaches a reciprocative electromechanical transducer for use in vehicle suspension. The transducer is used both as an electrical generator and as a shock absorber. Vertical movement of the wheel assembly relative to the chassis is converted into electricity to charge the vehicle battery or energize electrical components in the vehicle. Although the patent mentions switching the device between electrical generating and shock absorbing functions, it lacks any details of this switching system. However, some details are provided regarding the conversion of mechanical to electrical energy using the particular structure of the transducer.

There is a need for a system that provides the capability of utilizing otherwise wasted mechanical energy in the form of reciprocating vertical vehicle vibration and that can also modify vehicle riding comfort, including the capability of selecting between the two.

None of the above inventions and patents, taken either singly or in combination, is seen to describe the instant invention as claimed. Thus a system for selectively using converting axle vibration into electrical energy solving the aforementioned problems is desired.

SUMMARY OF THE INVENTION

The present invention is directed to a dual-use electromechanical energy transducer for a vehicle and a control system for selecting between two modes of operation: a current generating mode and a shock absorber assistant mode. In particular, the inventive system uses an electromagnetic transducer that can be selectively used to convert otherwise wasted mechanical movements in the form of vertical vibrations in a moving vehicle into electrical current for charging a battery. Alternatively, the transducer can be selectively used as an assistant for the shock absorbers to adjust the riding characteristics of the vehicle.

The dual-use transducer includes one or more magnets that move in direct response to the vertical vibrations of the axle during use of the vehicle. The magnet or magnets move in close proximity to, and perpendicularly to, windings in a current-carrying coil in accordance with Faraday's Law that relates induced voltage produced in a coil with the rate of change of the magnetic field. In a generator mode of operation, the transducer can be used to produce electrical current in the coil by movement of the magnets. Alternatively, the transducer can be used as an assistant to existing shock absorbers when the coil is shorted, thereby resisting movement of the magnet or magnets.

Accordingly, it is a principal object of the invention to provide a dual-use electromechanical transducer usable in a generator mode of operation for generating electrical energy and alternatively usable in a shock absorber assistant mode of operation, and to a system for selecting between the two modes.

It is an object of the invention to provide a dual-use electromechanical transducer that can be used simultaneously as a generator and a shock absorber.

It is another object of the invention to provide a system for converting axle vibration into electricity in which the transducer produces a current which can charge a battery.

It is a further object of the invention to provide a system for converting axle vibration into electricity in which the vehicle ride can selectively be altered when not being used to generate electricity.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed to a system for converting axle vibration into electricity, including an electromechanical transducer and a controller for selectively switching the transducer between an electrical energy producing mode of operation and a shock absorber assistant mode of operation. Also, the level of ride comfort can be selectively modified. The relationship between the movable and stationary portions of the transducer follow a well-known relationship between a reciprocating magnet moving inside a coil.

Figure 1:
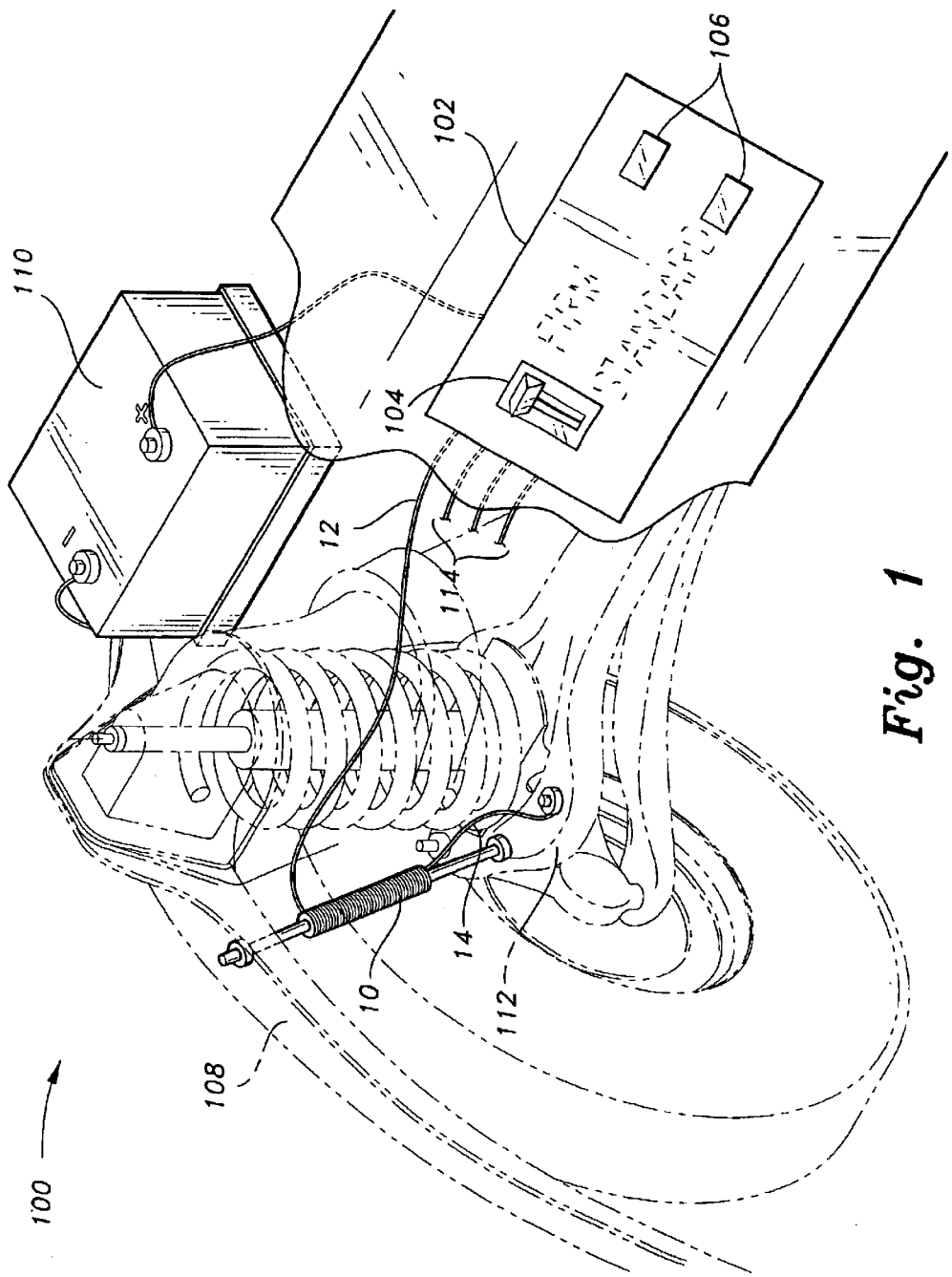
FIG. 1 is a perspective view of a system for converting axle vibration into electrical energy according to the present invention.

FIG. 1 shows a perspective cutaway view of an exemplary portion 100 of the suspension and chassis of a vehicle. The particular portion shown is part of a typical vehicle front suspension.

During use, as the vehicle is driven on uneven road surfaces, the suspension 112 moves (vibrates) with respect to the chassis 108 along a generally vertical direction. The dual use transducer 10 is installed in an appropriate location between the movable suspension and the chassis where the vertical movement is greatest while also avoiding interfering with the operation of the vehicle suspension. At one side, the electrical ground 14 of the transducer 10 is connected to an appropriate nearby location, in this case to an exposed contact point on the vehicle.

The positive output wire 12 from the transducer is connected to the control panel 102 which can form part of the vehicle dashboard. A switch 104 can be used to adjust the comfort level of the vehicle ride. Other switches or indicators 106 can be provided as needed, including those discussed below. Control panel 102 is connected to the battery 110.

The invention contemplates n (e.g., four) transducers mounted on the n (e.g., four) corresponding locations of the vehicle where the maximum vertical motion is encountered, i.e., near the outer ends of the axles and close to the wheels. Inputs 114 from the other transducers (transducer positive output wires) are connected to the control panel 102 as well.

Figure 2:
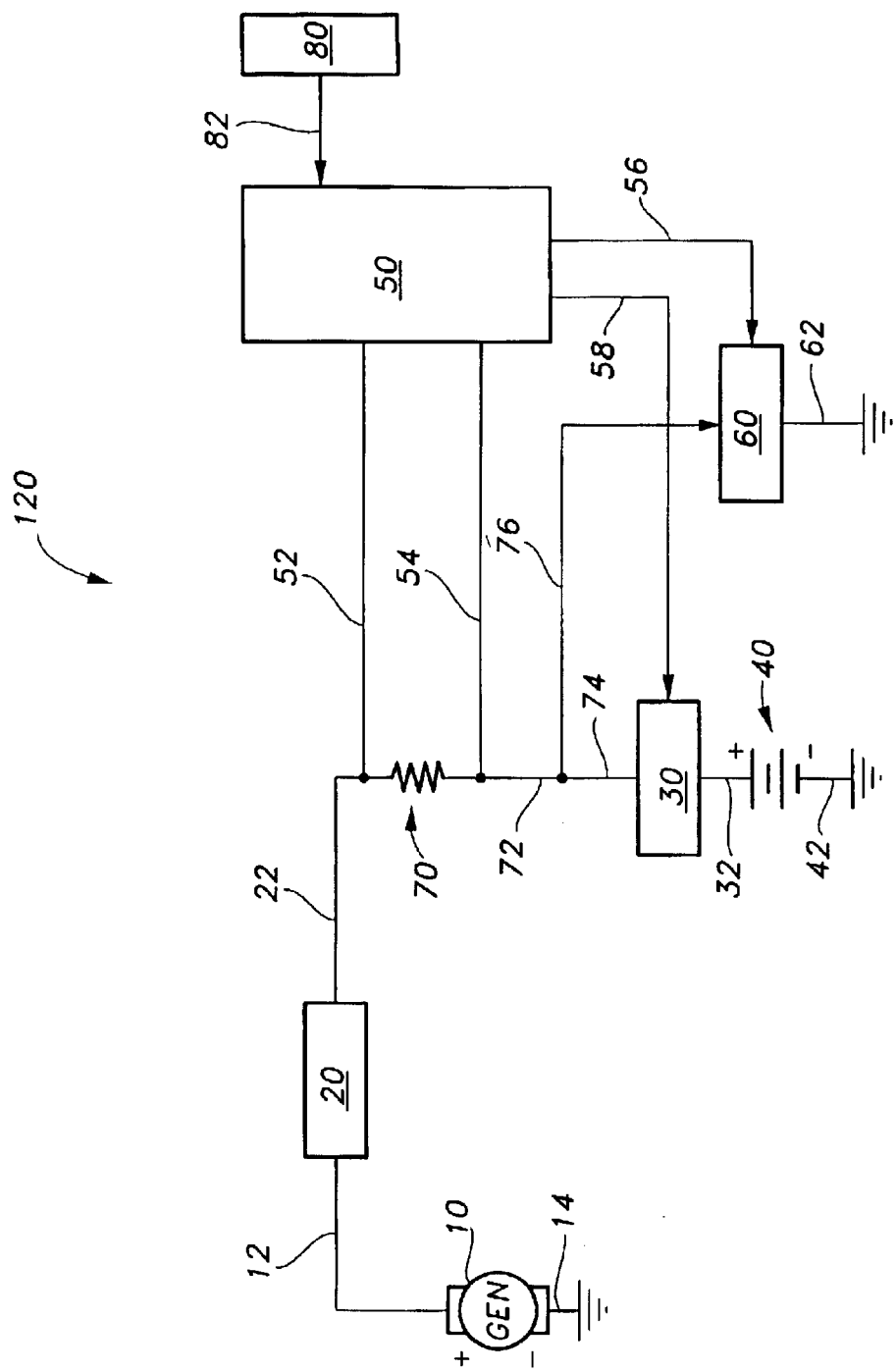
FIG. 2 is a schematic diagram of the system for converting axle vibration into electrical energy according to the present invention.

FIG. 2 shows a schematic view of the overall electrical system 120. Electrical output 12 from the transducer 10 enters the signal conditioning circuit device 20 that can include a voltage regulator, voltage stepper and/or rectifier, all of which are known to those having ordinary skill in the field of electronics. The particular components that make up circuit device 20 depend upon the type of transducer 10 and type of battery 40 used. For example, if the transducer produces a 12 volt output (or slightly larger) and a 12 volt battery is used, then a voltage stepper might not be necessary.

Only one control device 50 and one input panel 80 are required, and the battery 40. Devices 20, 30, 60 and 70 are repeated for each wheel in the system.

The conditioned current signal leaves conditioning device 20 in line 22. Control device 50 is connected in parallel with resistor 70 using sensing lines, 52 and 54, and senses the electrical current passing through line 22. The sensed current is then compared with settings 82 input by the user on the face of the input panel 80, which may be located on control panel 102. The settings can include selection between generator mode or shock absorber assistant mode, or the level of ride comfort, e.g., firm or standard.

Control device 50 outputs signals, 56 and 58, to circuit devices, 30 (an otherwise conventional DC to AC converter) and 60, that act as switches and further signal conditioners, as needed, in order to perform the functions described as follows. Circuit components used in devices, 30, 50 and 60 are well known in the field of electronic circuits and will be described only by their function.

Figure 3:
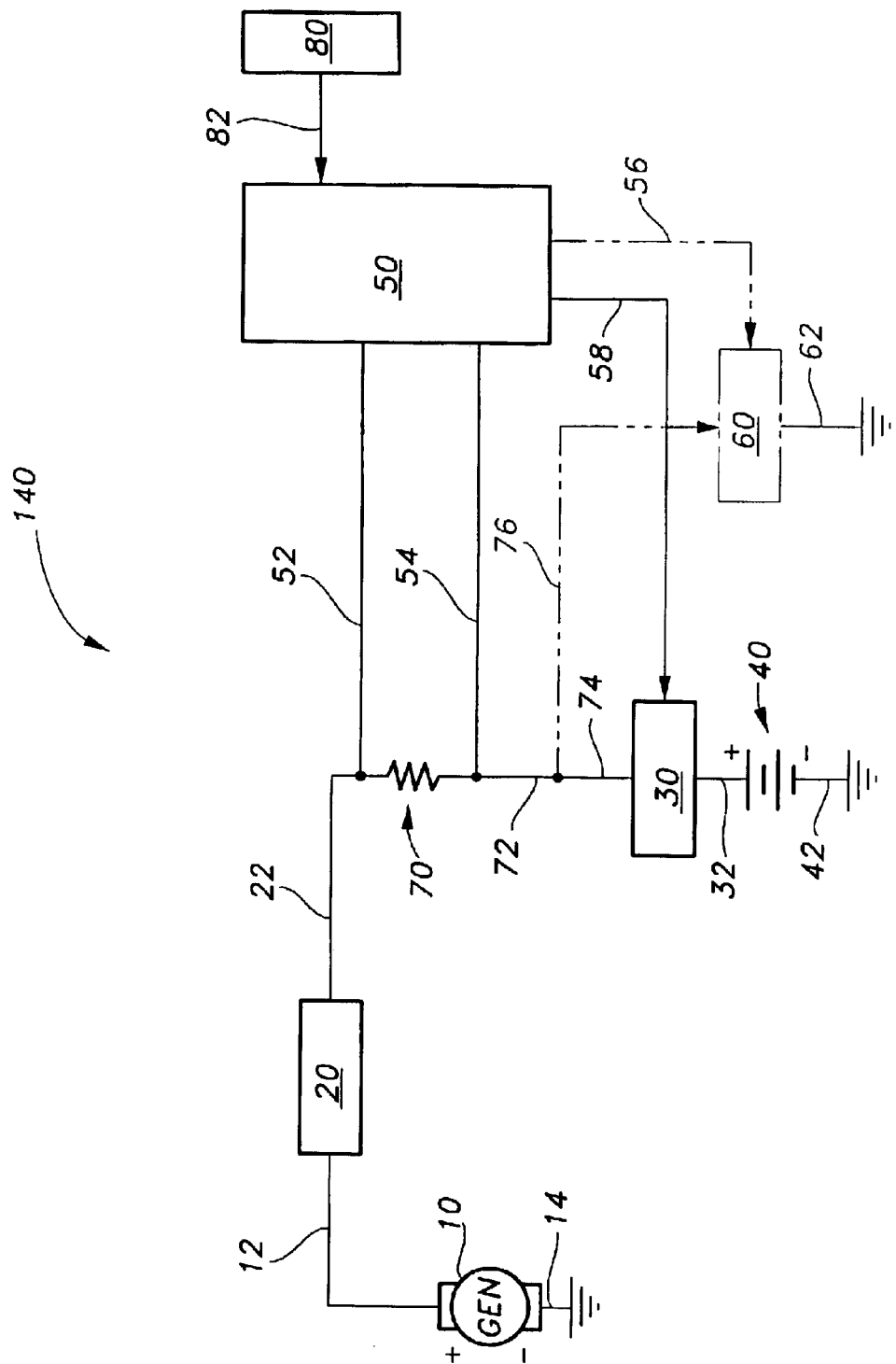
FIG. 3 is a schematic diagram of the system showing the generator mode of operation.
Figure 4:
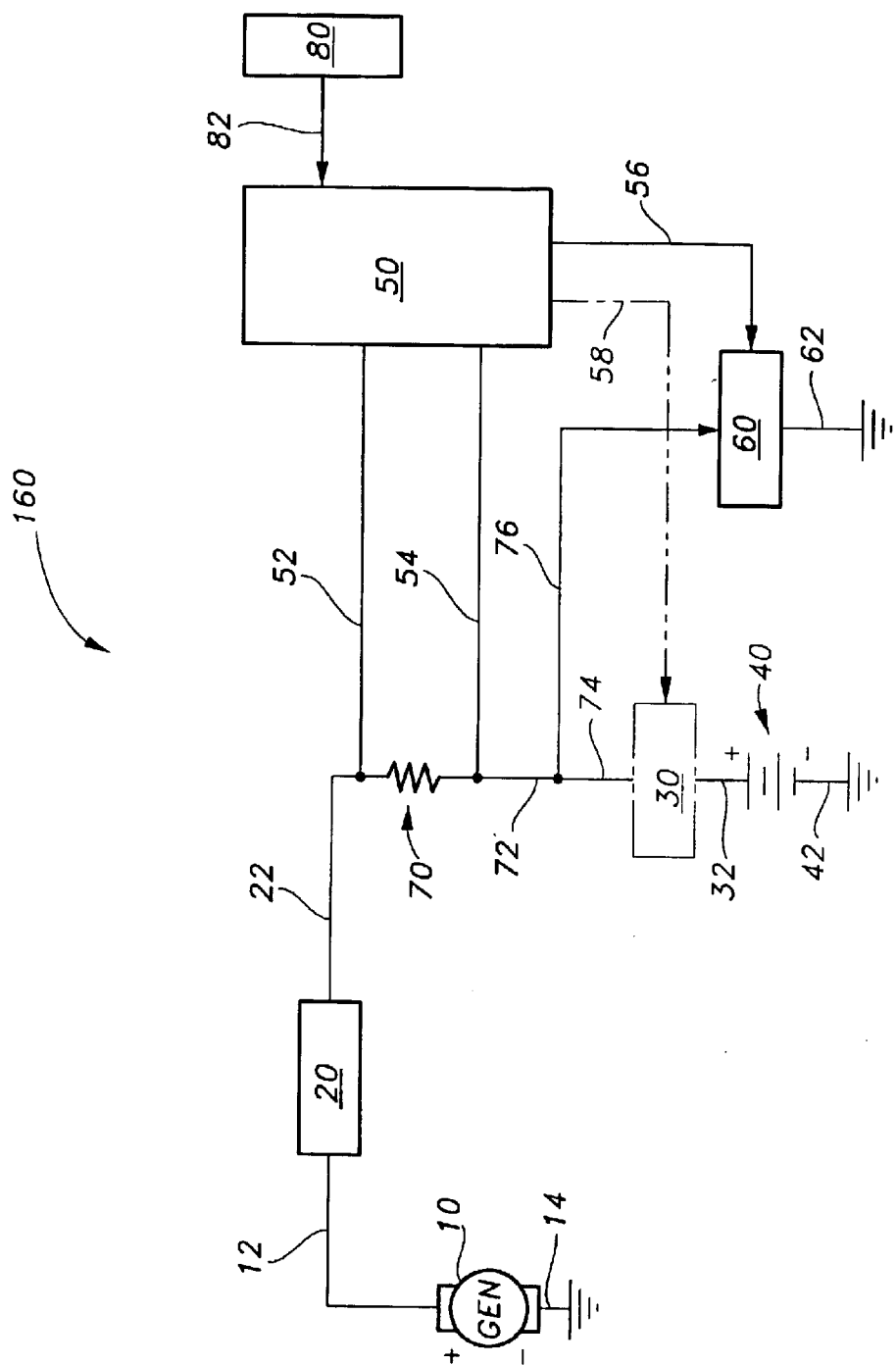
FIG. 4 is a schematic diagram of the system showing the shock absorber assistant mode of operation.

FIG. 3 shows a schematic of the electronic system in the generator mode 140. FIG. 4 shows a schematic of the system in the shock absorber assistant mode 160. These modes are selectable by an occupant in the vehicle on the face 80 of the control panel.

In the generator mode shown in FIG. 3, controller 50 sends a signal 58 to device 30 to permit current from generator 10 to pass through line 32 to battery 40 thereby charging it. However, although the current is shown being used for recharging a battery, it can also be used instead for operating electrical devices, such as indoor lights, as well, in a manner known in the art.

Battery input signal conditioning device 30 is provided with any necessary electrical components that prevent reverse current flow from the battery.

In the shock absorber assistant mode 160 shown in FIG. 4, controller 50 sends a signal 58 to device 30 to block current coming from line 72 from being used to recharge battery 40. Instead, current passes through line 76 to shock absorber assistant device 60. Depending upon the ride comfort setting selected on the face of control panel 80, e.g., standard or firm, controller 50 sends signal 56 to device 60 to either block or pass current from line 76 to ground 62, or to set the amount of current by-pass anywhere in between.

If the setting at input 80 is for a standard ride comfort, then signal 56 turns device 60 into the equivalent of an electrical open in line 76, thereby preventing current from passing to ground 62. At this setting, the level of ride comfort is entirely determined by the shock absorbers already provided on the vehicle. The transducer 10 does not provide additional cushioning to supplement the existing shock absorbers. This setting is one of the two possible extremes that can be set by the vehicle operator.

Alternatively, if the setting at input is at the opposite extreme, namely "firm", then signal 56 turns device 60 effectively into a shunt, causing the current produced by transducer to be shorted to ground. This causes the windings in the transducer to resist the movement of the magnet in one of the directions of movement. As a result, the transducer acts effectively as a shock absorber assistant by causing the ride to become firmer. This setting would be most appropriate on smooth, level roads.

Between these two extremes, the setting can be adjusted to provide any desired level of comfort from standard to firm. Devices, 50 and 60, can include any suitable electrical components to produce the range of ride comfort, including transistors, both purely electrical and electrooptical. Thus, controller 50 can provide either electrical or optical signals, 56 and 58.

It is to be understood that the present invention is not limited to the embodiments described above, but encompasses any and all embodiments within the scope of the following claims.

I claim:

1. A system for converting axle vibration into electricity, comprising:
    an electromagnetic transducer including:
        a housing disposed between a frame of a vehicle and an axle;
        a current-carrying coil fixed in said housing; and
        a magnet movable in a reciprocating manner in said coil in order to generate an electrical current when the axle vibrates vertically; and a controller for selecting a simultaneous or an alternative generator mode of operation and a shock absorber mode of operation, wherein the controller is manually selectable between the generator mode and the shock absorber assistant mode, or simultaneous generator and shock absorber modes;

wherein in the generator mode, the motion of the magnet relative to the coil produces electrical current in the coil, and in the shock absorber mode, the motion of the magnet is resisted by the coil.

* * * * *